US005626211A

United States Patent [19]
Gewelber et al.

[11] Patent Number: 5,626,211
[45] Date of Patent: May 6, 1997

[54] MULTI-LAYER DISK BRAKE ROTOR

[76] Inventors: Ytzhak Gewelber, 15510 Olive Branch, La Mirada, Calif. 90638; Peter J. Kinney, 19512 Pompano La. #102, Huntington Beach, Calif. 92648

[21] Appl. No.: 538,598

[22] Filed: Oct. 3, 1995

[51] Int. Cl.⁶ .................................................. F16D 65/12
[52] U.S. Cl. .................... 188/218; 188/71.6; 188/73.2; 188/264 AA; 228/182
[58] Field of Search .................... 188/218, 71.6, 188/73.2, 264 A, 264 AA, 251 R, 250 B, 250 G; 192/113.2, 113.23, 113.21, 113.22, 107 R, 70.12; 228/155, 182, 114.5; 219/121.14

[56] References Cited

U.S. PATENT DOCUMENTS

| | | | |
|---|---|---|---|
| 2,345,016 | 3/1944 | Tack | 188/218 X |
| 2,368,621 | 2/1945 | Tack | 188/218 X |
| 2,410,195 | 10/1946 | Baselt et al. | 188/218 X |
| 2,477,500 | 7/1949 | Tack | 188/218 X |
| 3,391,763 | 7/1968 | Severson | 188/264 AA |
| 3,426,871 | 2/1969 | Harnish . | |
| 3,456,768 | 7/1969 | Holcomb, Jr. . | |
| 3,486,218 | 12/1969 | Buyzo | 188/218 X |
| 3,610,873 | 10/1971 | Vansteenkiste | 219/121.14 |
| 3,623,577 | 11/1971 | Scharlack | 188/264 AA |
| 3,623,579 | 11/1971 | Hendrickson et al. | 188/264 AA |
| 3,625,319 | 12/1971 | Krause . | |
| 3,712,427 | 1/1973 | Cook et al. . | |
| 3,712,428 | 1/1973 | Marin . | |
| 3,730,304 | 5/1973 | Buyze | 188/218 X |
| 3,731,769 | 5/1973 | Ely . | |
| 3,800,392 | 4/1974 | Cook et al. | 188/218 X |
| 3,899,054 | 8/1975 | Huntress et al. | 188/218 X |
| 3,913,716 | 10/1975 | Sedlock | 188/218 X |
| 3,915,262 | 10/1975 | Klaue . | |
| 3,946,192 | 3/1976 | Allen et al. | 188/218 X |
| 3,948,363 | 4/1976 | Ely . | |
| 3,948,364 | 4/1976 | Lowey . | |
| 4,155,432 | 5/1979 | Krause . | |
| 4,230,253 | 10/1980 | Ehright et al. | 228/182 |
| 4,263,992 | 4/1981 | Moore et al. | 188/264 AA |
| 4,606,437 | 8/1986 | Mikina . | |
| 4,618,334 | 10/1986 | Miranti, Jr. | 192/113.23 |
| 5,005,676 | 4/1991 | Gassiat | 188/218 X |
| 5,255,761 | 10/1993 | Zaremsky . | |
| 5,299,667 | 4/1994 | Hammond | 188/218 X |
| 5,306,678 | 4/1994 | Yoshida et al. . | |
| 5,454,454 | 10/1995 | Easton et al. | 188/218 X |
| 5,474,161 | 12/1995 | Eaton, III et al. | 188/218 X |
| 5,509,510 | 4/1996 | Ihm | 188/218 X |
| 5,526,914 | 6/1996 | Dwivedi et al. | 188/218 X |
| 5,535,857 | 7/1996 | Barlow | 188/218 X |

FOREIGN PATENT DOCUMENTS

| | | | |
|---|---|---|---|
| 3115740 | 11/1982 | Germany | 188/71.6 |
| 3740309 | 6/1989 | Germany | 188/71.6 |
| 0149428 | 9/1983 | Japan | 188/218 X |

*Primary Examiner*—Douglas C. Butler
*Attorney, Agent, or Firm*—Wagner & Middlebrook

[57] ABSTRACT

A disk or rotor for a disk brake system is formed of a number of stacked metal plates, normally with outside plates having a high resistance to abrasion and great strength and with inner plates formed of metal having good heat transfer characteristics and having inside and outside rims and generally radially directed slots between the rims, the inner plates being aligned such that the slots are held in registry, and all of the inner and outer plates are brazed together to form a unitary disk. Inside and outside diameters are then both trimmed to remove the rims and open the slots between fins formed when the inside and outside rims are cut away. One or more outside plates on one end of the stack are trimmed to a smaller diameter thus leaving a flange which is drilled to provide mounting holes for the disk. Modified forms of the disk include solid inside plates and inside plates with perforations or corrugations.

24 Claims, 4 Drawing Sheets

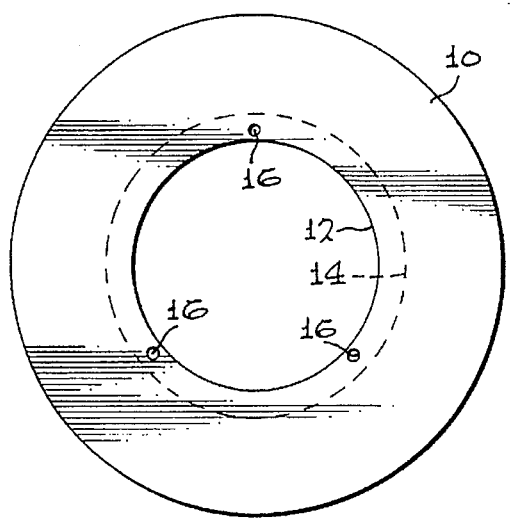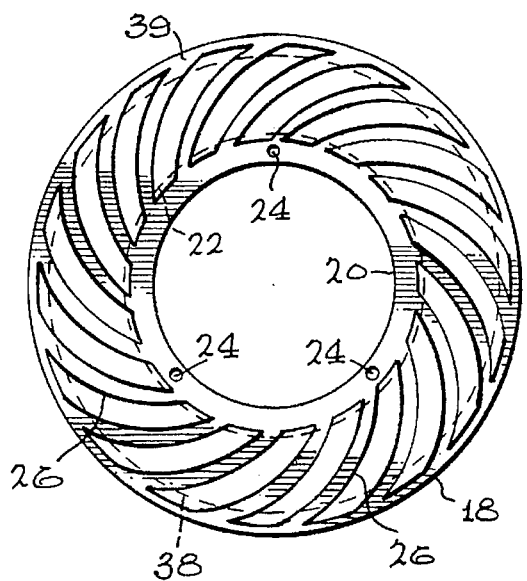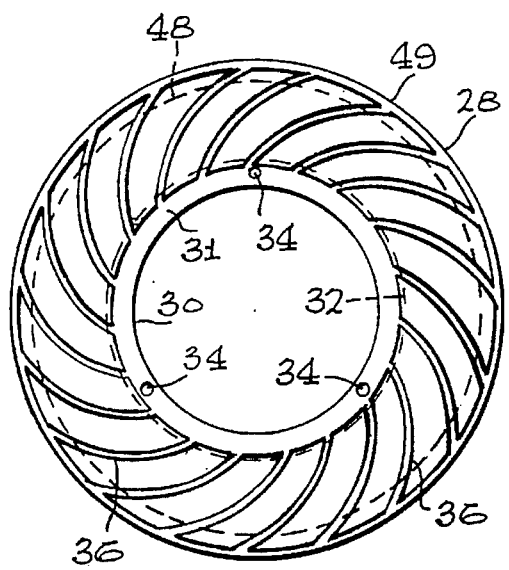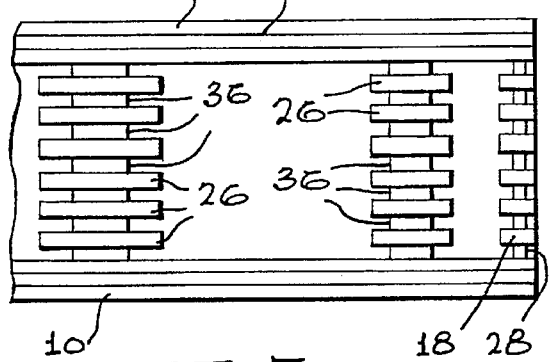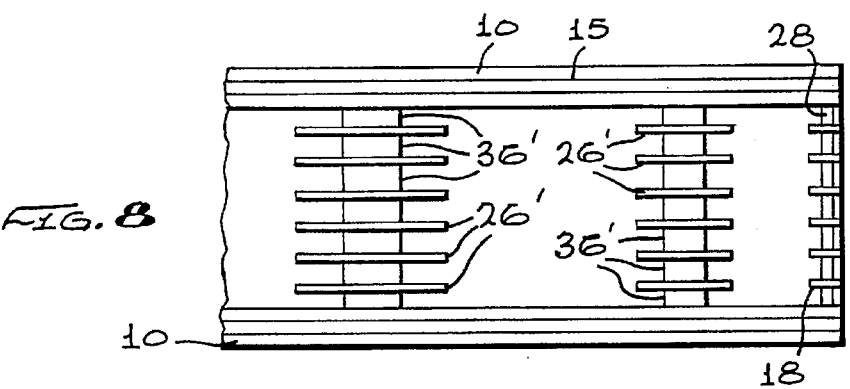

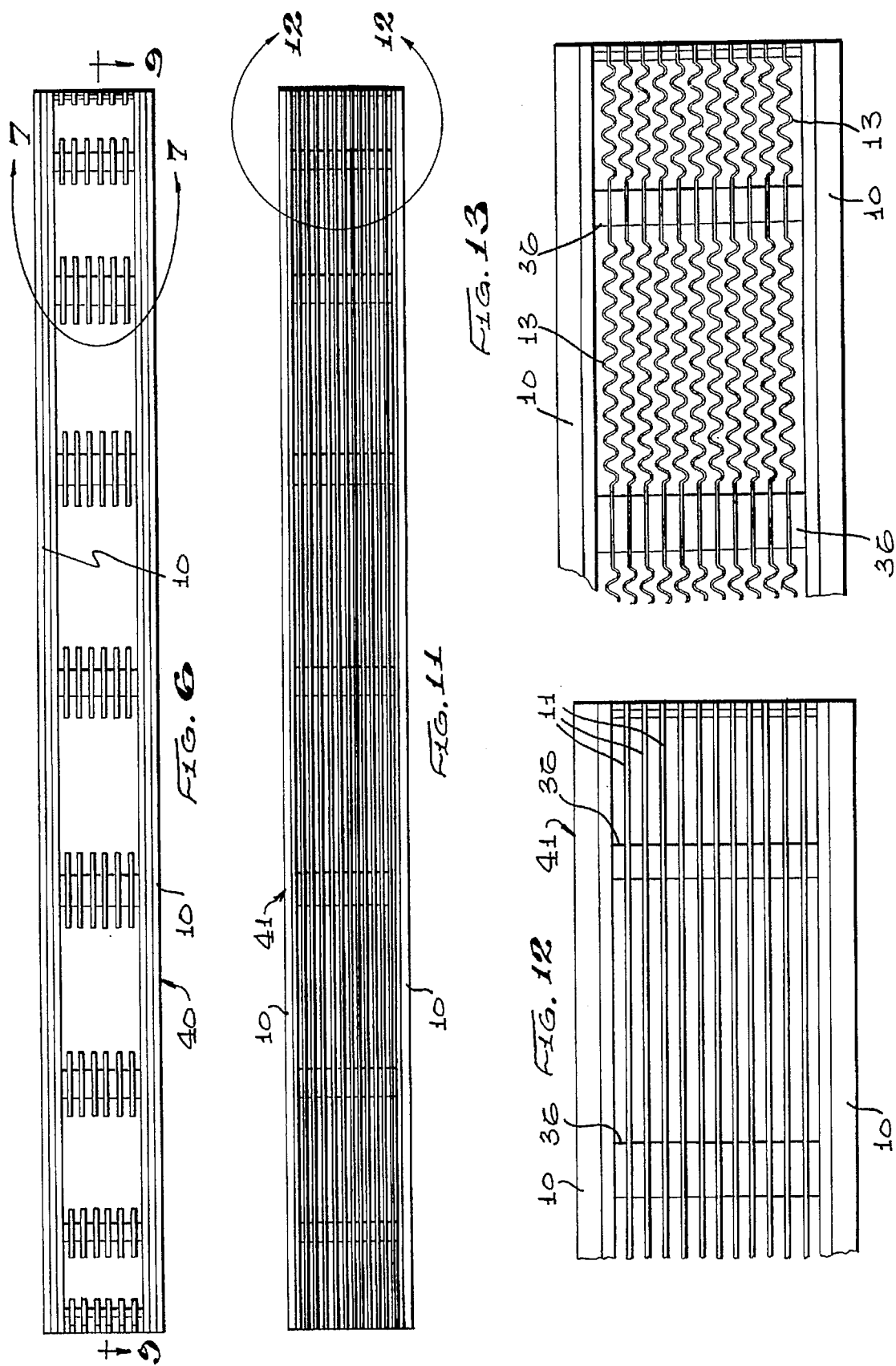

MULTI-LAYER DISK BRAKE ROTOR

BACKGROUND OF THE INVENTION

Various configurations of disk brakes have been in large volume production for many years. Disk brakes have been useful because they provide advantages such as excellent heat dissipation and light weight in comparison with the braking load. In the case of aircraft brakes, the braking loads from large jet aircraft are extremely high and have required manufacturers to continually press the state of the art in order to deal with the tremendous heat loads experienced particularly upon landing. One response has been to go to carbon composite materials as disclosed in the Ely U.S. Pat. No. 3,731,769 and in Yoshida U.S. Pat. No. 5,306,078. Another problem resulting from the heat generated in aircraft brakes has been warping of the rotors. One approach to dealing with this problem is disclosed in the Holcomb U.S. Pat. No. 3,456,768 which teaches segmented disk elements with laminated sections.

The requirements for materials used in disk brakes are several, some of which are as follows:

1. High conductive thermal coefficient to transfer thermal energy;
2. High friction coefficient;
3. High metal strength to prevent distortion and breaking;
4. Low weight; and
5. Minimizing of metal galling, especially at high temperatures.

Preferably, all of the above should be accomplished within the framework of low to reasonable production costs and therefore, low selling price.

The kinetic energy absorbed in a vehicle disk brake is equivalent to the total kinetic energy of the vehicle it is stopping, divided by the number of disks. This kinetic energy is converted into heat and has to be rejected to the mounting structure of the wheel and to the surrounding atmosphere.

The two most common processes used in the manufacture of complete (non-segmented) rotors for disk brakes are casting and/or machining from billets of solid metal. These methods are limited to cast iron, steel alloys or aluminum alloys. Metal castings tend to be crude and must be heavy to provide the required heat dissipation and strength at high temperatures. Casting makes it possible to incorporate cooling fins. However, the casting process is limited in the amount of internal cooling fins that can be produced. Cast material physical properties are usually low.

Machining from a solid billet of material produces a lighter disk rotor than can be achieved by casting. It is not possible, however, to provide the needed internal fins that aid cooling and such rotors are therefore susceptible to failure from heat.

Some aircraft and race car applications use solid graphite disks with holes drilled axially to create the desired air passages. The thermal surface available for cooling in these disks is limited. These graphite disks need to work at very high temperatures to achieve the necessary friction coefficient. This can lead to overheating and failure of the other brake components.

In really severe service such as landing loads of large aircraft and with racing cars, the heating loads are such that the brakes are frequently short lived and failures are not uncommon. There is therefore a continuing need for improved disk brakes, and, more particularly, for improved rotor constructions capable of dissipating heat more effectively than rotor designs presently available.

SUMMARY OF THE INVENTION

The present invention involves a new design for a disk brake rotor and process of manufacturing such design. Applicants have provided a disk brake rotor which meets the requirements set forth above and which provides very superior heat dissipation.

A major concept of this invention is the fabrication of a disk rotor from layers of individually chosen metal sheets. By having the ability to choose the properties of the metal in relation to the function of the location, the designer gains more freedom to optimize the performance of the disk rotor used in his particular application. For example, the external layers can be chosen to have high strength and abrasion resistance, while the inner layers can be selected to incorporate a fin design for high convective heat transfer coefficient, high thermal conductivity and low metal cost. The layers should be stacked symmetrically to prevent any distortion due to mismatch of thermal expansion coefficient. Metals must be chosen carefully to assure good adhesion during brazing.

The disk layers can be manufactured by several methods. For low volume production laser or water jet cutting is recommended. For high volume production, stamping or precision fine blanking are the preferred methods.

The thickness of each layer is determined by the stamping tooling capabilities available and the thermal requirements of the rotor assembly.

Where costs will permit, the outer layers can be made of high strength, high temperature metals such as INCONEL 600 series or INCONEL 718. For less expensive production, these outer layers may be of high strength steel.

The inner layers which are formed to provide internal fins can be made from less expensive metals such as low carbon steel or stainless steel alloys. In rotors where the high cost can be justified, high nickel content alloys should be used for long wear. In rotors where weight reduction is the main objective, Titanium, Beryllium, Beryllium/Aluminum, or high temperature 8002 Aluminum alloys can be used in the manufacture of the inner and outer layers. Again, the major drawback is the cost of these alloys.

This layering approach allows for the use of high temperature, high strength alloys on the outside surfaces where they are needed and less expensive metal alloys in the inner section of the rotor with out sacrificing the rotor's performance and intricate fin design.

Once fabricated, the plates are stacked to the required thickness and then brazed together. The type of brazing used will differ according to the type of metals utilized. Some high nickel content alloys need to be nickel plated to ensure good wetting and brazing. Steel and Stainless Steel are available with thin layers of copper on one or both sides. This copper layer becomes the braze alloy that joins all layers. In other cases braze shim is placed between all layers prior to brazing.

Vacuum brazing is preferred in aluminum because it provides a cleaner and stronger joint. However, this process cannot be used for all alloys as is understood by those skilled in the art. Brazing should be uniform and continuous across all the layers.

Multiple cycle brazing is also an option. In some cases a portion of the layers are brazed first then reprocessed and additional secondary braze operations with different temperatures and braze alloys can be used.

After brazing some alloys will need be quenched, straightened, stress relieved and aged as required for the particular metal or brazed assembly.

Following the brazing step and such quenching, stress relieving and/or aging steps as are required, the inside and outside diameters are machined to remove excess metal and to open the passageways between the fins. On the inside diameter a plurality of mounting holes are drilled and an additional machining step is added to remove excess metal leaving a series of bosses surrounding the mounting holes.

Design of the plates should minimize the weight while maximizing the surface area available for heat transfer. As the rotor rotates, air is pulled in from the center and is discharged, through the impeller-type design on the outer diameter.

BRIEF DESCRIPTION OF THE DRAWINGS

This invention may be more clearly understood with the following detailed description and by reference to the drawings in which:

FIG. 1 is a front elevational view of an external plate used in producing a disk according to the invention;

FIG. 2 is a front elevational view of an internal fin plate forming part of a disk according to the invention;

FIG. 3 is a front elevational view of a fin spacer plate forming part of a disk according to the invention;

FIG. 6 is a side view of the disk of FIG. 5;

FIG. 7 is an enlarged fragmentary view of the encircled portion of FIG. 6 marked 7—7;

FIG. 8 is an enlarged fragmentary view similar to FIG. 7 of a modified embodiment of the invention;

FIG. 11 is a side view of the disk of FIG. 10;

FIG. 12 is an enlarged fragmentary view of the encircled portion of FIG. 13 marked 12—12; and FIG. 13 is an enlarged fragmentary view similar to FIG. 12 of a modified embodiment of the invention.

DETAILED DESCRIPTION OF THE INVENTION

Figure 4:
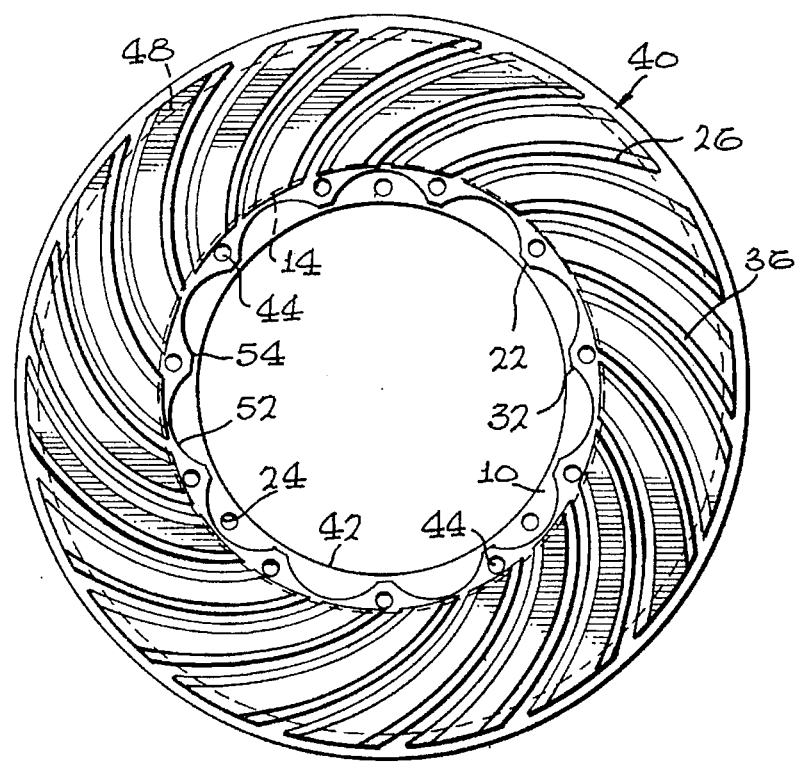
FIG. 4 is a front elevational view of a disk according to the invention at a partial stage of completion and with the top or external plate removed for clarity.

Referring now to FIG. 1, a front elevational view of a solid external plate 10 is shown. This plate, which may be formed by a number of methods including stamping includes a circular central hole or port 12. This plate is formed somewhat larger in diameter than the ultimate disk and also the port 12 is smaller to accommodate portions which are later machined away. These external plates may be of low carbon steel, stainless steel alloys, high nickel alloys, titanium or other materials listed above. Port 12 is trimmed to the diameter shown by the dashed line 14. Located within line 14 are some small alignment pin holes 16 which receive alignment pins. These holes are common to all plates in the assembly.

FIG. 2 is a front elevational view of one of the internal fin plates 18 forming part of a disk according to the invention. This plate is larger than the ultimate diameter of the disk to include an external support ring 39 and a central port 20 which are later machined away to finished diameters represented by dashed lines 22 38. Plate 18 also includes holes 24 for alignment pins. This plate also includes a large number of arcuate fins 26. These inner plates may be of steel, aluminum, nickel or titanium alloys and are usually made of thinner sheet metal than other components in the assembly.

FIG. 3 is a front elevational view of one of the fin spacer plates 28 forming part of a disk according to the invention. These plates can also be formed by stamping but are much thicker than fin plates 18. Spacer plates 28 are typically 0.030" to 0.125" thick, although this limitation or thickness is primarily based on the capability of the stamping equipment available. This plate 28 is also of somewhat greater diameter than the disk ultimately produced and also includes external fin spacer support ring 49, a central port 30 and internal fin spacer support ring 31 which is later machined after brazing to the dashed line 32. This plate includes alignment pin openings 34. Plate 28 also includes a large number of arcuate fin spacers 36.

FIG. 4 is a front elevational view of a disk 40 according to the invention shown at a partial stage of completion and with the top plate or plates 10 removed for clarity. In this view, the top plate shown is a fin spacer plate 28. Behind plate 28 are a number of fin plates 18 alternated with other fin plates 18 and one or more of external plates 10, all of which are assembled with the aid of alignment pins 19 and brazed together. Appropriate braze shim is placed between each layer when needed. Following the brazing step, the alignment pins are cut off from passages 24 and 44 and the internal diameters of fin plates 18 and fin spacer plates 28 are trimmed to line 14. With the disk 40 secured from the inside, the outside diameter is then cut away to line 48 which opens to the outside spaces between the fins 26 and fin spacers 36 and between fin spacer plates 28 and fin plates 18.

With the disk 40 then secured from the outside, the flange 42 of disk or disks 10 (which has not been trimmed away) is drilled to provide a series of mounting holes 44 for securing the disk to a rotating wheel structure. The internal diameter of the disks 18 and 28 as well as the top external disk or disks 10 which are not shown in FIG. 4 are trimmed to line 14 which opens the inside spaces between fins 26 and fin spacers 36 and between fin spacer plates 28 and fin plates 18 leaving passages for air to flow between the several fins. The flange 42 of the bottom disk or disks 10 is them trimmed to line 52 to remove excess metal and leaving a scalloped pattern with a plurality of bosses 54 surrounding mounting holes 44. It will be appreciated that the several spaces between fins 28 and 36 of the several stacked plates 10, 18 and 28 will permit a large volume of air to flow radially through the disk 40 and which can carry off a substantial amount of energy from fins 26 and 36. This removes far more heat than can be removed by simple external fins or slots in the outer edge surfaces of the disks which are employed in disks now in use.

Figure 5:
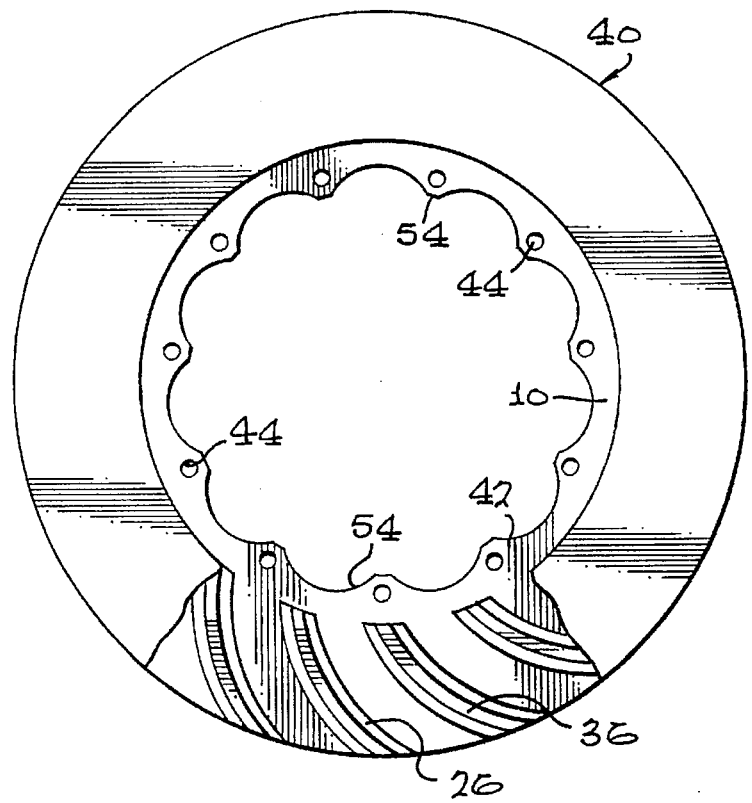
FIG. 5 is a front elevational view, shown partly broken away, of a finished machined disk according to the invention.

FIG. 5 is a front elevational view, shown partly broken away, of a finished machined disk 40 according to the invention. The rear external plates 10 are shown with flange 42 containing bosses 54 surrounding the several mounting holes 44. A portion of the front external plate or plates 10 is shown broken away to disclose the fin spacers 36 which overlie fins 26. This internal structure may be more apparent from FIGS. 6 and 7 of which FIG. 6 is a side view of the disk 40 of FIG. 5. FIG. 7 is an enlarged view of the encircled portion of FIG. 6 marked 7—7 and shows details of the alternating layers of fins 26 and fin spacer structure 36. In this case, there are three of the disks 10 on each end of the stack between which there may be layers of braze alloy 15.

Between the plates 10 are a series of fins 26 and a series of fin spacer plates 36. In this case fins 26 result from stacking seven of plates 28 and fins 26 interspersed with six of plates 18. As shown in FIG. 7, the plates 18 and 28 from which fins 26 and 36 were formed were of substantially equal thickness. FIG. 8 shows a view of an alternate arrangement using the same arrangement as in FIG. 7 except that the relative thicknesses of the fins 36' and 26' are much different with fins 26' being thinner and wider and fins 36' being somewhat thicker than their counterparts in FIG. 7.

Figure 9:
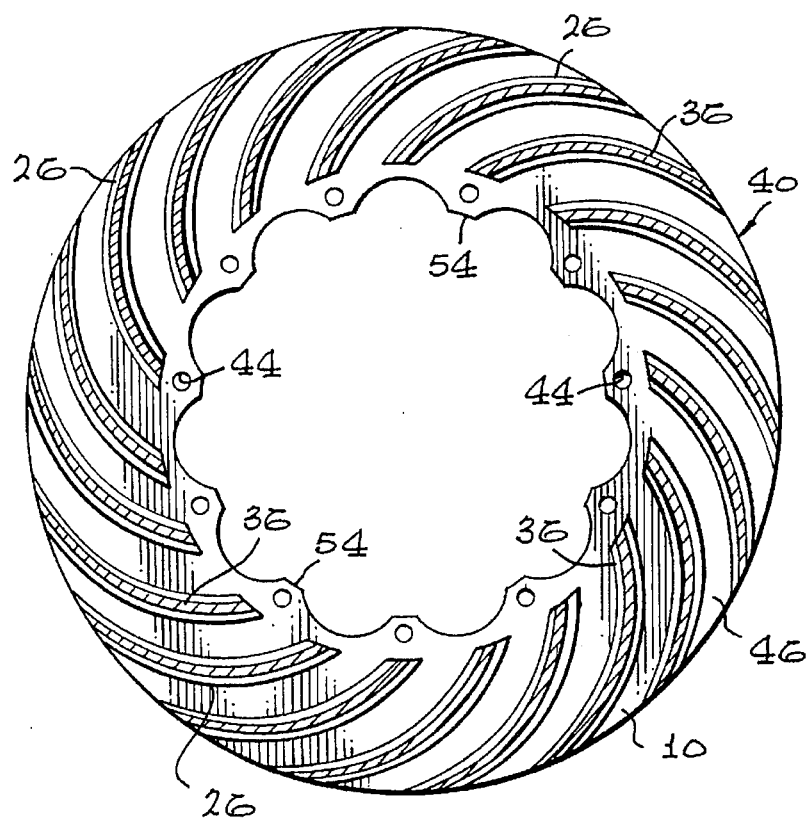
FIG. 9 is a sectional view taken along line 9—9 of FIG. 6.

FIG. 9 is a sectional view taken along line 9—9 of FIG. 6 and shows a rear plate 10 with the bosses 54 and mounting holes 44. Brazed to the plate 10 are a plurality of the fins 26 and fin spacers 36 which are essentially like the fins of FIG. 7. In this view the section is taken through what initially was one of the plates 28 so a series of fin spacers 36 are shown in section. Immediately below fin spacers 36 in the stack are fins 26 which are not shown in section. Air passages 46 are shown with large surface areas for heat transfer.

Figure 10:
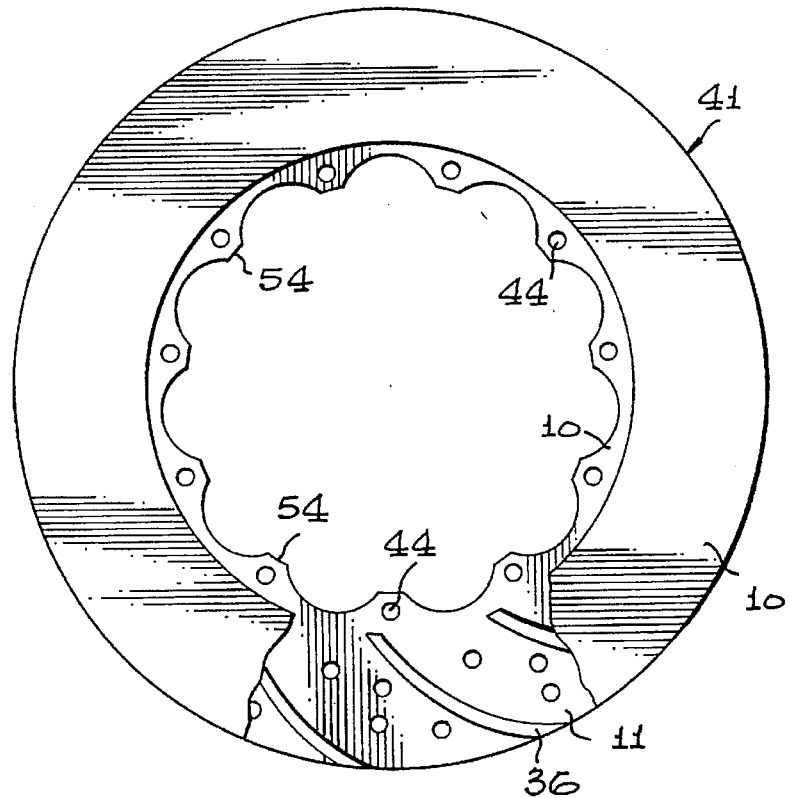
FIG. 10 is a front elevational view of an alternate embodiment of the invention.

FIG. 10 is a front elevational view, shown partly broken away, of a disk 41 including an alternate embodiment of the invention. In this embodiment a rear solid plate 10 is shown having bosses 54 and mounting holes 44 as described above. A portion of the front plate 10 is broken away to show one of a series of internal spacer plates 11 which are solid except that some or all of such plates 11 may be perforated to aid in air mixing to remove heat from the disk assembly. Brazed to and between plates 11 are a plurality of fin spacers 36 which are formed from plates 18 as described above.

FIG. 11 is a side view of the embodiment of FIG. 10. In this view, a number of horizontal lines are shown parallel to the faces of plates 10 which indicate that solid plates 11 are alternated with the layers of fin spacer plates 36. This structure is more clearly shown in FIG. 12 which is an enlarged view of the encircled portion of FIG. 11 marked 12—12. In this view some solid or perforated plates 11 are located between fin spacer plates 36. Plates 11 may also be perforated to aid in air circulation. This disk 41 is manufactured in essentially the same way as described above with the exterior plates 10, plates 11 and fin spacer plates 36 brazed together to produce a unitary disk.

FIG. 13 shows a modification of the disk 41 in which the internal plates 13' are corrugated or louvered to create more turbulent air flow to carry off heat. Plates 13' may also be perforated. Also plates 13' have substantial additional area exposed to the air flow through disk 41. Heat generated at the surface of the disk (plate 10) will be transferred through fin spacers 36 to the series of plates 13' and is carried away by the air passing through the disk.

It is recognized that many variations are possible as to numbers, widths and thicknesses of fins, as to numbers of the external plates and as to configurations of internal solid plates and many of these variations will result from engineering judgments based on costs, performance requirements, materials selected, etc.

The above described embodiments of the present invention are merely descriptive of its principles and are not to be considered limiting. The scope of the present invention instead shall be determined from the scope of the following claims including their equivalents.

What is claimed is:

1. A process for manufacturing a disk used in a disk brake system comprising the steps of:
   a) forming a plurality of solid metal plates with a center hole;
   b) forming a plurality of plates having a center hole and cut out sections defining generally radially directed passages;
   c) stacking said plates with said cut out sections aligned and secured in position and with at least one of said solid plates on each end of said stack;
   d) brazing said plates together, to form a unitary assembly;
   e) trimming the inside and outside edge surfaces of said brazed assembly to open said passages, leaving an inwardly extending flange on at least one of said solid metal plates; and
   f) drilling mounting holes in said flange.

2. A process for manufacturing a disk as claimed in claim 1 wherein at least one of said solid metal plates is a separator plate stacked between said plates having cut out sections.

3. A process for manufacturing a disk as claimed in claim 2 wherein said separator plate is perforated.

4. A process for manufacturing a disk as claimed in claim 2 wherein during step b) at least some of said solid internal plates are formed with an offset fin pattern.

5. A process for manufacturing a disk as claimed in claim 1 wherein step d) is a vacuum brazing process.

6. A process for manufacturing a disk as claimed in claim 1 wherein said plates on each end of said stack are of a high temperature high nickel content alloy.

7. A process for manufacturing a disk as claimed in claim 1 wherein braze shim material is placed between at least some of said plates prior to brazing.

8. A process as claimed in claim 1 wherein portions of said flange between said mounting holes are removed.

9. A disk used in a disk brake system formed of a plurality of metal plates stacked and brazed together to form a unitary disk, said disk including a solid metal plate having a center hole on each end and first and second groups of internal metal plates each having a center hole and multiple generally radial slots between said solid plates, said second group of internal metal plates having slots aligned with and narrower than said slots in said first group of internal metal plates, the plates of said first group forming fins stacked between plates of said second group the outside and inside diameters of said internal metal plates being cut away to open generally radial passages between said fins, said solid metal plate on one end of said stack having a smaller inside diameter than other plates in said stack thereby constituting a flange, and mounting holes in said flange.

10. A disk as claimed in claim 9 wherein at least one of said solid plates is positioned between two of said plates having cut out sections.

11. A disk as claimed in claim 9 wherein some of said plates having radial slots are substantially thicker than others of said plates having radial slots.

12. A disk as claimed in claim 9 wherein at least some of said internal plates have a corrugated pattern to increase internal surface area.

13. A disk as claimed in claim 9 wherein said generally radial slots are arcuate to provide arcuate generally radial passages between said fins.

14. A disk for a disk brake system comprising stacked generally annular metal plates brazed together to form a unitary disk, said plates including solid outside annular plates and inside plates having inside and outside rims said inside plates including first and second groups of said inside plates each having a plurality of generally radially directed slots between said rims with the plates of said first group defining fins and the plates of said second group having wider slots than the plates of said first group defining a plurality of fin spacers, said plates of said second group being stacked between and aligned with plates of said first group to produce a plurality of generally radial slots separated by said fins and fin spacers, said plates being trimmed to remove said rims and open said slots, a radially inwardly directed flange on an outside plate on one end of said stack, and mounting holes in said flange.

15. A disk as claimed in claim 14 wherein said solid outside annular plates are of a first metal and said inside plates are of a second metal.

16. A disk as claimed in claim 14 wherein said inner layers are formed with generally radially directed arcuate fins.

17. A disk as claimed in claim 14 wherein said inner layers are stacked to form a series of air passageways such that when said disk is rotated, air flows radially outwardly between said fins.

18. A disk as claimed in claim 14 wherein said solid outside annular plates are of a high temperature high nickel content alloy.

19. A disk as claimed in claim 14 wherein said inner layers are of low carbon steel.

20. A disk as claimed in claim 14 wherein at least some of said inside metal plates are of stainless steel.

21. A disk as claimed in claim 14 wherein at least some of said solid outside metal plates are of high temperature aluminum alloy material.

22. A disk as claimed in claim 14 wherein at least one of said solid annular plates is positioned between two of said inside annular plates.

23. A disk for a disk brake as claimed in claim 14 wherein said solid outside annular plates are of high strength metal alloys and said inside annular plates are formed of metal having high thermal conductivity.

24. A disk as claimed in claim 14 wherein said inside stacked metal plates have alignment holes in said inside and outside rings and alignment pins are placed in said holes prior to said plates being trimmed.

* * * * *